under steam pressure # UNITED STATES PATENT OFFICE.

RICHARD BERLINER, OF MOSCOW, RUSSIA.

PROCESS FOR MANUFACTURING GLUE.

1,176,644.  Specification of Letters Patent.  Patented Mar. 21, 1916.

No Drawing.  Application filed May 26, 1914. Serial No. 841,146.

*To all whom it may concern:*

Be it known that I, RICHARD BERLINER, a citizen of the German Empire, residing at Moscow, Russia, have invented certain new and useful Improvements in Processes for Manufacturing Glue, of which the following is a specification.

It has heretofore been proposed to obtain light-colored glue from bones, whether the fat has been previously extracted or not, by treating the bones with gaseous sulfurous acid, then washing the acid-treated bones to wash out the substances dissolved by the acid and to remove the acid from the bones, and then boiling out the glue from bones thus treated. In case fat-containing bones are used as the raw material for this prior process, the bone-grease or fat is then separated after the glue-boiling operation.

I have discovered that a more intensive bleaching of fat-containing bones with gaseous sulfurous acid can be effected, if the washing of the acid-treated bones is omitted and the steps of fat and glue extraction are reversed, viz., the extraction of fat is effected immediately after the acid treatment and the glue thereafter extracted.

This process is based on the discovery that the sulfurous acid can be expelled without washing if the fat extraction takes place immediately after the acid treatment and is not postponed to the extraction of the glue.

By my process, not only is the washing step omitted as the superfluous acid is entirely removed by the fat extraction, but the bleaching effect is increased as the acid contained in the dissolved fat performs an additional bleaching action during its escape from the pores of the bones so that the entire material is bleached throughout.

During the removal of the acidified fat from the bones in a liquid state, the acid moisture of the raw material is evaporated and the sulfurous acid comes into much closer contact with the walls of the pores than when gaseous acid only is used. The bleaching effect of the sulfurous acid is therefore increased by the fat extracting process and is perceivable not only on the outside of the raw material, but throughout the inner portions of the bones. The intensive action of the acidified fat is apparent from the fact that the sinews and cartilage assume an amber-like appearance and do not shrink during the fat-extracting process.

The quantity of sulfurous acid used in my process must be so proportioned that the structure of the bones is not affected. It is further important that bones from which the fat has not been extracted should be used as the starting material since bones, if free from fat, will not be affected by the bleaching action exerted upon the walls of the pores of the bones by the acid contained in the bone-grease during the expulsion of the fat.

An example of the manner in which my process is carried out, is as follows:—The crude bones to be treated are put into a suitable vessel and gaseous sulfurous acid is passed through the bones within the receptacle. This gas treatment is continued for about six hours for each 8000 kg. of bones; and the quantity of gas used is that produced by burning one-half kg. of sulfur for each 100 kg. of bones. The acid treatment being finished, the bones now containing acid vapors within their pores, are treated with vapors of a fat-dissolving medium, such as benzin. The benzin vapors dissolve the fat within the pores of the bones, the resulting solution flowing from the bones collecting at the bottom of the receptacle. The benzin vapors take with them the acid contained within the pores of the bones and may be condensed to liquid form and used again and again for the fat-extracting bone treatment. After the fat extraction is finished, the bones are brought into a polishing drum in order to completely clean them from adhering impurities. This treatment is readily effected in a short time because of the effective action of the sulfurous acid. The bones are then broken up, in a disintegrating machine, into small lumps about the size of a hazel nut. After this treatment the granulated bones are introduced into an autoclave where they are treated alternatingly with steam under pressure of, say, one atmosphere and with hot water. In this way the glue contained in the bones is formed under steam pressure and extracted by the hot water. This well-known process of alternating treatment with steam and water is repeated for, say, 12 to 15 times, until the whole of the glue contents is extracted.

What I claim is:

A process for producing glue which consists in treating fatty bones with gaseous sulfurous acid, extracting the fat from the bones thus acidified and thereby expelling the sulfurous acid and therefore boiling out the glue from the said fat-extracted bones.

In testimony whereof I affix my signature in presence of two witnesses.

RICHARD BERLINER.

Witnesses:
   CHR. ERFURT,
   LYDIA RÖLL.

Copies of this patent may be obtained for five cents each, by addressing the "Commissioner of Patents, Washington, D. C."

It is hereby certified that in Letters Patent No. 1,176,644, granted March 21, 1916, upon the application of Richard Berliner, of Moscow, Russia, for an improvement in "Processes for Manufacturing Glue," an error appears in the printed specification requiring correction as follows: Page 2, line 9, claim, for the word "therefore" read *thereupon;* and that the said Letters Patent should be read with this correction therein that the same may conform to the record of the case in the Patent Office.

Signed and sealed this 19th day of June, A. D., 1917.

[SEAL.]
F. W. H. CLAY,
*Acting Commissioner of Patents.*